United States Patent [19]

Watts

[11] 4,137,638
[45] Feb. 6, 1979

[54] ELECTROMECHANICAL SURVEY VEHICLE AND METHOD

[76] Inventor: Robert G. Watts, 3803 Sullivant Ave., Columbus, Ohio 43228

[21] Appl. No.: 836,722

[22] Filed: Sep. 26, 1977

[51] Int. Cl.² ........................... G01B 7/00; G01B 7/28
[52] U.S. Cl. .................................... 33/141.5; 33/142; 33/174 L; 33/174 P; 364/560
[58] Field of Search .................. 33/1 H, 141.5, 174 R, 33/174 L, 174 P, 354, 142; 235/92 MT, 92 DN; 364/560

[56] References Cited

U.S. PATENT DOCUMENTS

| 1,769,521 | 7/1930 | Lamb | 33/174 R |
|---|---|---|---|
| 3,594,912 | 7/1971 | Sauterel | 33/174 R |
| 3,604,119 | 9/1971 | Inoue | 33/141.5 |
| 3,789,511 | 2/1974 | Groom et al. | 33/174 L |

FOREIGN PATENT DOCUMENTS

| 188068 | 3/1937 | Switzerland | 33/141.5 |
|---|---|---|---|
| 451010 | 7/1936 | United Kingdom | 33/141.5 |

*Primary Examiner*—Richard R. Stearns
*Attorney, Agent, or Firm*—Burns, Doane, Swecker & Mathis

[57] ABSTRACT

A method and vehicle are disclosed for surveying terrain by providing data from which three-dimensional coordinates of the path of the vehicle on the terrain are calculated. The vehicle includes two members articulated to one another and each member is supported on the surface by at least one wheel. The vehicle is positioned and the initial three-dimensional coordinates of a specific point on the first member and the initial orientation of the first member are determined from conventional surveying data. The vehicle is then moved a predetermined distance so that the second member tracks the first member. When the second member is located and oriented in approximately the initial position of the first member, measurements are made to determine the changes in the angle between the two members with respect to each of the axes. The new three-dimensional coordinates of the specific point on the first member and the orientation of the first member are determined from the previous three dimensional coordinates, the previous orientation of the first member, the length of the first member, and changes in the angle between the two members with respect to each of the axes. Such three-dimensional coordinates may be calculated at locations at spaced intervals along the path of the vehicle to survey the terrain.

24 Claims, 17 Drawing Figures

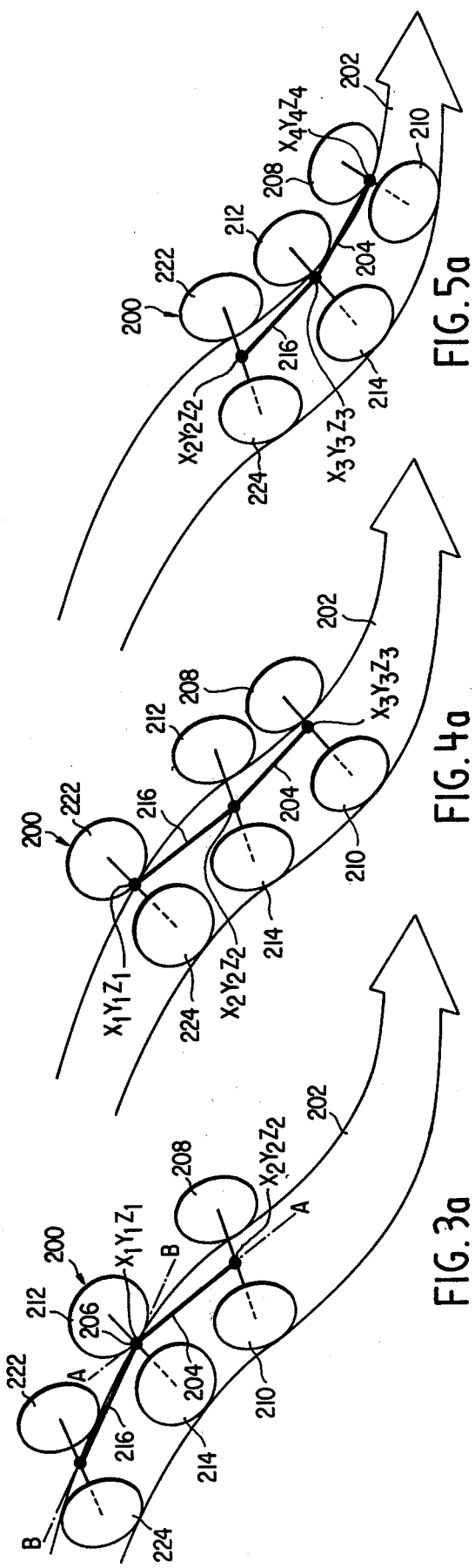
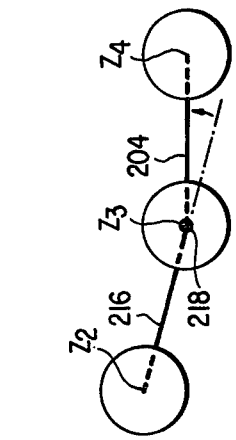
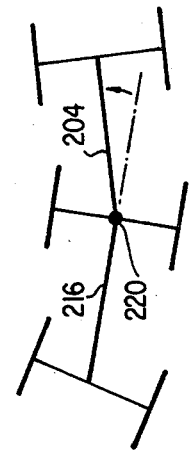
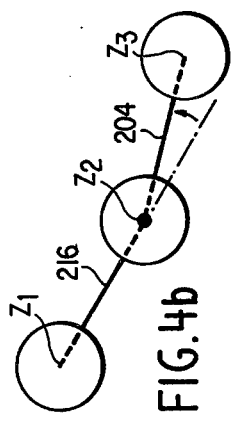
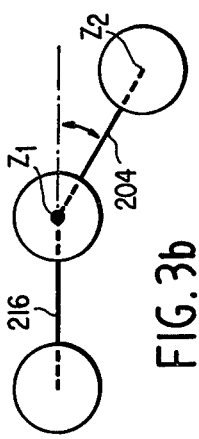
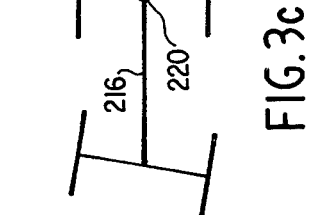

ELECTROMECHANICAL SURVEY VEHICLE AND METHOD

BACKGROUND OF THE INVENTION

The present invention relates to a geometrical instrument and method for traversing and surveying a surface. Specifically, a method and vehicle are disclosed for providing data from which three-dimensional coordinates of a large number of points along the path of the vehicle on a surface may be calculated. The data provided by such a vehicle and method may be used in large-scale land surveys, for example, as a part of flood control analysis or as an aid in highway design. The method may also be used to profile existing roads or to provide reference points for use in conjunction with the preparation of topographical and/or planimetric maps from aerial photographs.

Known wheeled devices for road or railroad vehicles have been provided for measuring parameters of the surface over which the vehicles travel. Such devices are illustrated for example in U.S. Pat. No. 3,594,912 to Sauterel, U.S. Pat. No. 3,263,332 to Plasser, and Belgian Pat. No. 562,683 to Maysounave. These devices are, however, designed to measure the surface contour over which the vehicle passes with respect to immediately adjacent road or track areas and do not provide data from which locational coordinates or points on the vehicle path can be determined.

Accordingly, it is an object of the present invention to provide a survey vehicle for providing data from which locational coordinates of points on the vehicle path can be determined.

It is another object of the present invention to provide a method for surveying a surface to determine three-dimensional coordinates of points along a path on the surface.

Known surveying devices, adapted to be carried by a land vehicle, employ gyro systems or compasses to provide reference data from which locational coordinates of the vehicle may be calculated. Such systems are illustrated, for example in U.S. Pat. No. 3,604,119 to Inoue, and U.S. Pat. No. 3,002,282 to Rumrill. A commercial system employing an inertial platform coupled with gyroscopes and accelerometers has been built by Litton Guidance and Control Systems. See "Results of Tests Using An Inertial Rapid Geodetic Survey System (RGSS)", *Proceedings of the American Congress on Surveying and Mapping*, 37th Annual Meeting, p. 100, Library of Congress Catalog No. 50-33534. Such systems use the gyroscope to provide fixed reference data. The position of the vehicle is determined by measuring movement of the vehicle with respect to the reference data.

Such systems have a disadvantage in that they are difficult and expensive to fabricate due, principally, to the complexity and close tolerances required to construct an operable inertial platform for terrain surveys similar to that employed in missile guidance systems. In operation, the gyroscopic systems have several disadvantages. First, start up of the system necessitates the time consuming process of initializing the gyroscopes. Secondly, the vehicle must be stopped at intervals throughout the survey to permit the system to compensate for precession of the gyroscopes. Finally, rapid acceleration and deceleration of the vehicle, such as that produced when the vehicle is driven over chuck holes, tend to destabilize the gyroscopes with consequent degradation of the survey measurements.

Accordingly, it is an object of the present invention to provide an automatic high-speed surveying device which is inexpensive to fabricate.

It is another object of the present invention to provide a survey vehicle and method which does not employ one or more gyroscopes to provide a reference for determination of locational coordinates of the vehicle.

It is another object of the present invention to provide a survey vehicle device which may be continuously moved over a surface to make measurements from which three-dimensional coordinates of points on the path of travel may be determined.

It is another object of the present invention to provide a survey vehicle which may be moved over a surface to produce data from which three-dimensional coordinates of points on the path of the vehicle may be calculated, which vehicle produces accurate data which is unaffected by rapid acceleration or deceleration of the vehicle during travel along the path.

Other known vehicle mounted survey devices employ one or more pendulums as sources of a reference axis. Such devices are illustrated for example in U.S. Pat. No. 2,647,323 to Johnson et al, and U.S. Pat. No. 2,552,890 to Eisler. Such systems have the disadvantages, inter alia, that (1) they measure only the elevation of the vehicle; and (2) the quality of their measurements is degraded by acceleration and deceleration of the vehicle which disturbs the equilibrium of the pendulum.

Accordingly, it is another object of the present invention to provide a survey vehicle and method which does not employ a pendulum or other gravity sensitive means to provide a reference direction for determination of locational coordinates of the vehicle.

These and other objects and features will become apparent from the following description when read with the claims and the appended drawings.

THE DRAWINGS

Figure 6:
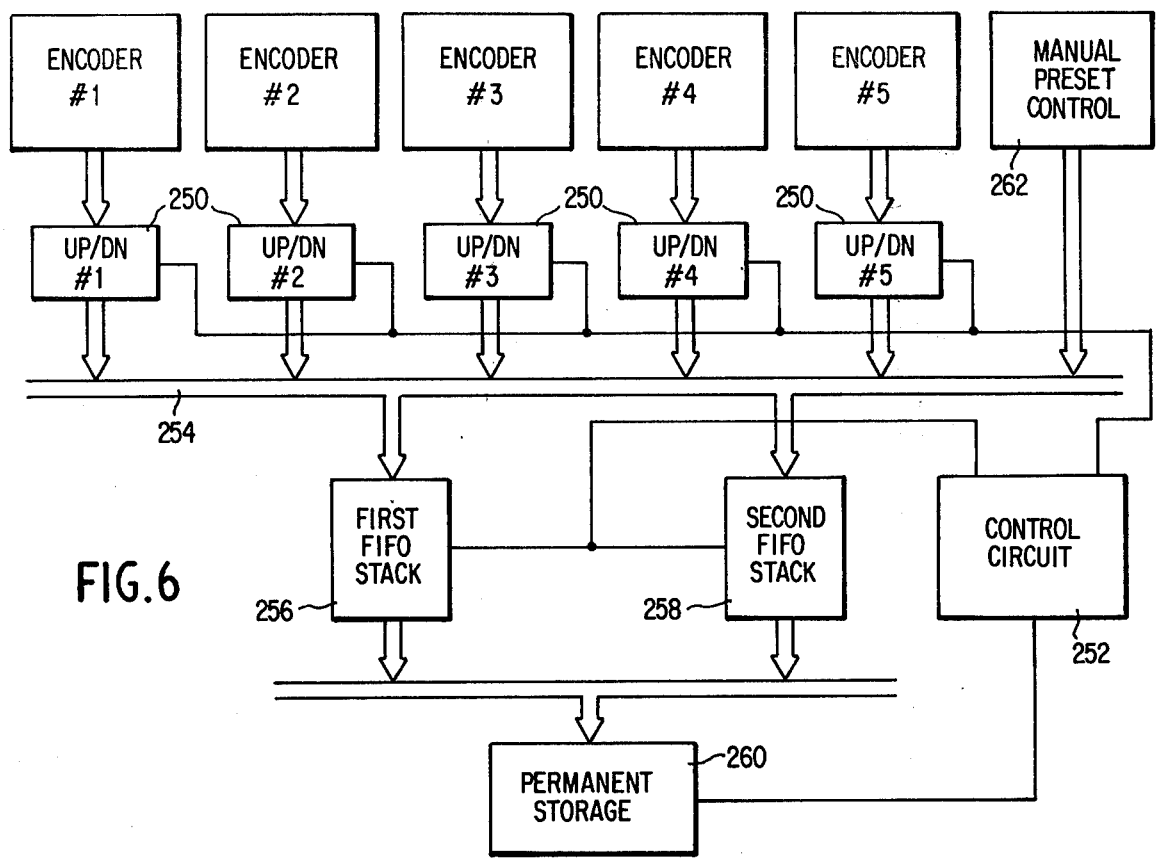
Figure 7:
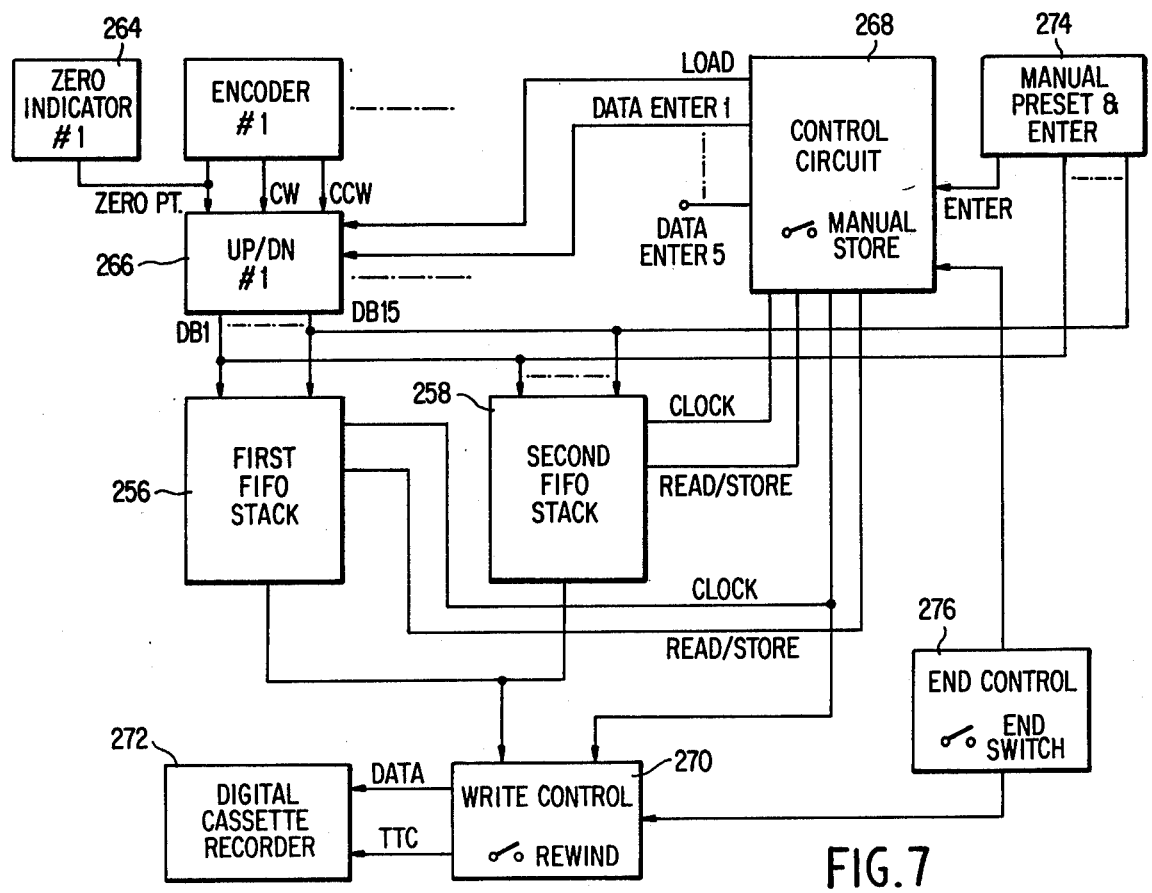
Figure 8:
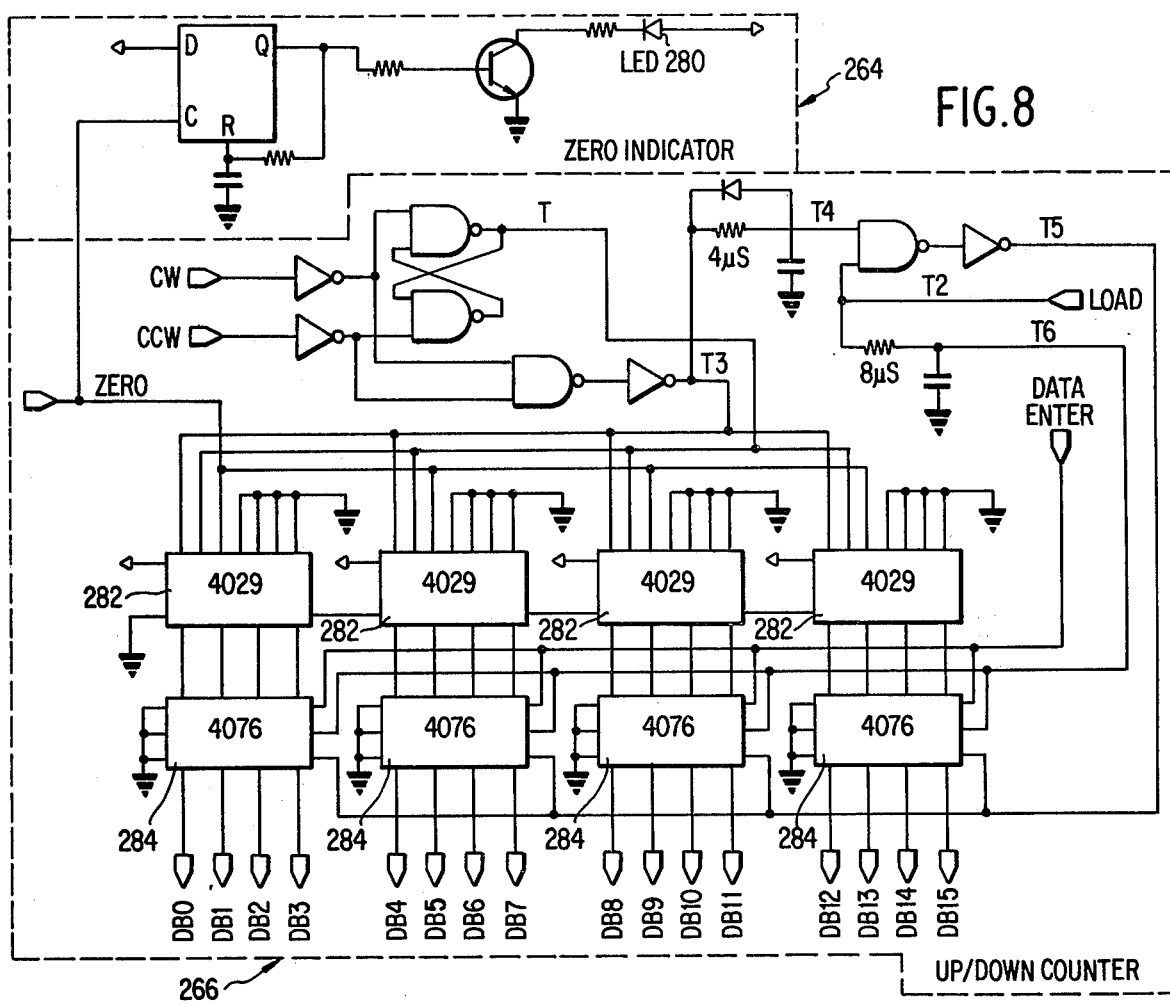
Figure 9:
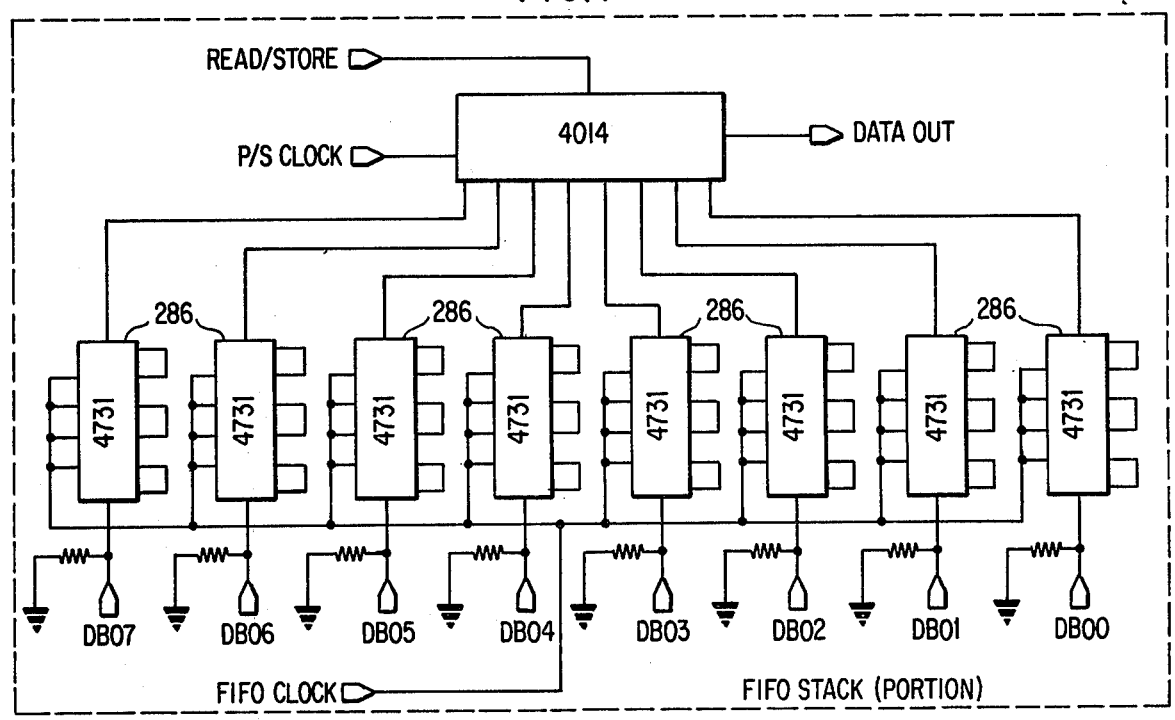
Figure 10:
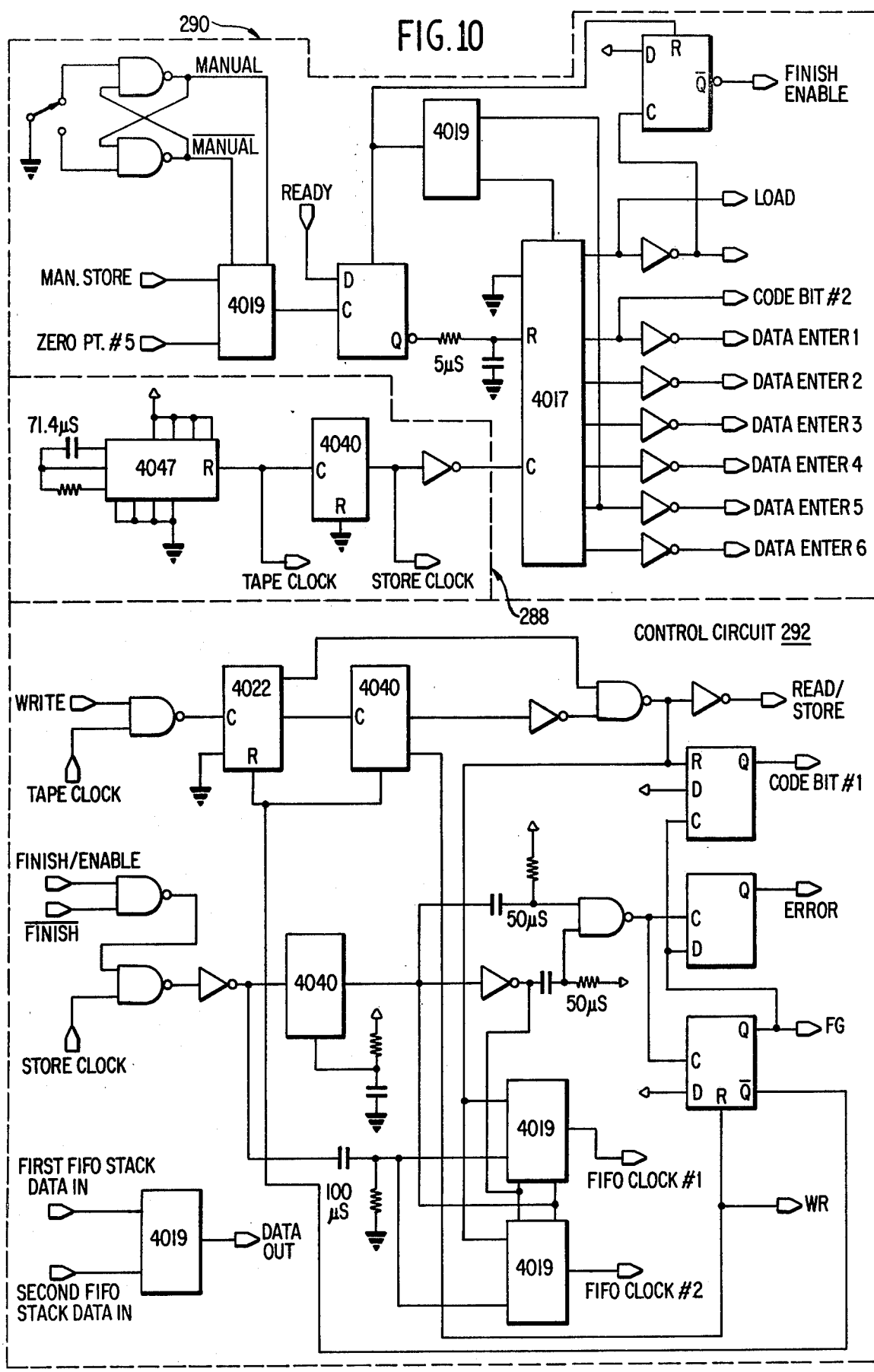
Figure 11:
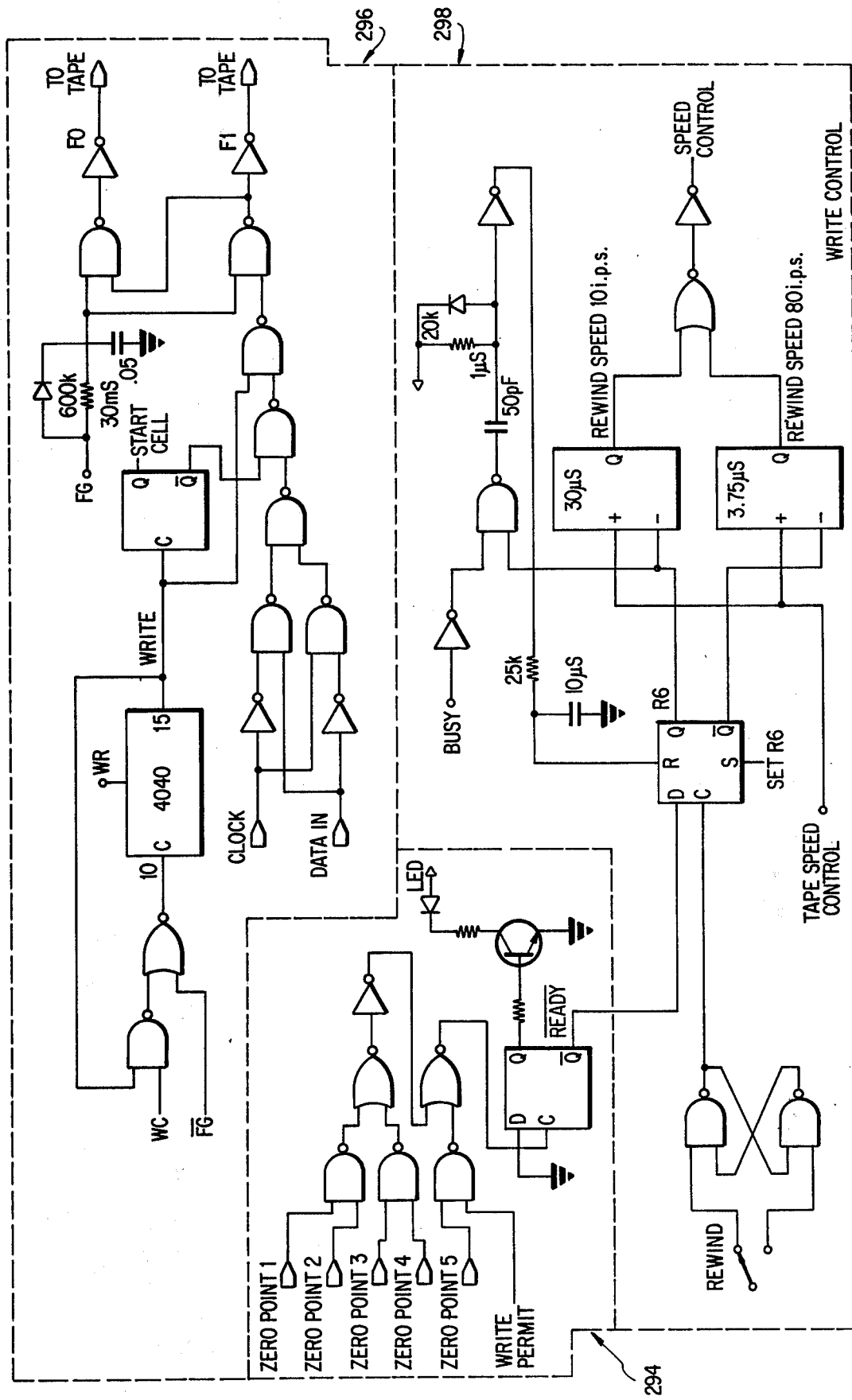

FIGS. 3a–c, 4a–c, and 5a–c are sequential stick diagrams illustrating the operation of a survey vehicle embodiment of the present invention;

FIG. 6 is a schematic block diagram of an electronic data recording device for use with a survey vehicle of the present invention;

FIG. 7 is a schematic block diagram illustrating details of the data recording device shown in FIG. 6;

FIG. 8 is a schematic diagram of a zero indicator and up/down counter such as may be employed in the data recording device of FIG. 6;

FIG. 9 is a schematic diagram of a portion of a FIFO stack circuit such as may be employed in the data recording device of FIG. 6;

FIG. 10 is a schematic diagram of a control circuit such as may be employed in the data recording device of FIG. 6; and FIG. 11 is a schematic diagram of a tape write control circuit such as may be employed in the data recording device of FIG. 6.

DETAILED DESCRIPTION

To facilitate an understanding of the embodiments of the present invention, the following description is divided into four parts:

I. A Preferred Embodiment of the Survey Vehicle of the Present Invention

II. Determination of Locational Coordinates From Data Measured on the Survey Vehicle III. A Device for Recording Data Measured on the Survey Vehicle IV. Processing of Data Measured by the Preferred Embodiment of the Survey Vehicle to Calculate Locational Coordinates Along the Survey Path An object of the below-described system is to measure, record and process information which may provide three-dimensional coordinates of specific points along the vehicle path. Such data may be used by surveyors, engineers, photogrammetrists, etc. Though the system is described in connection with a survey vehicle adapted to be moved over the surface of the terrain to be surveyed, it will be understood that the survey vehicle is adapted for providing locational coordinates of virtually any surface, e.g. the floors of bodies of water or the surfaces of extra terrestrail bodies, such as the moon.

As used herein, the phrase "three-dimensional coordinate" is used in its most general sense to identify one or more of the coordinates necessary to identify a location with respect to a reference coordinate system. Such a reference coordinate system may be a rectilinear coordinate system, a spherical coordinate system, a cylindrical coordinate system, etc.

I. A PREFERRED EMBODIMENT OF A SURVEY VEHICLE OF THE PRESENT INVENTION

Figure 1:
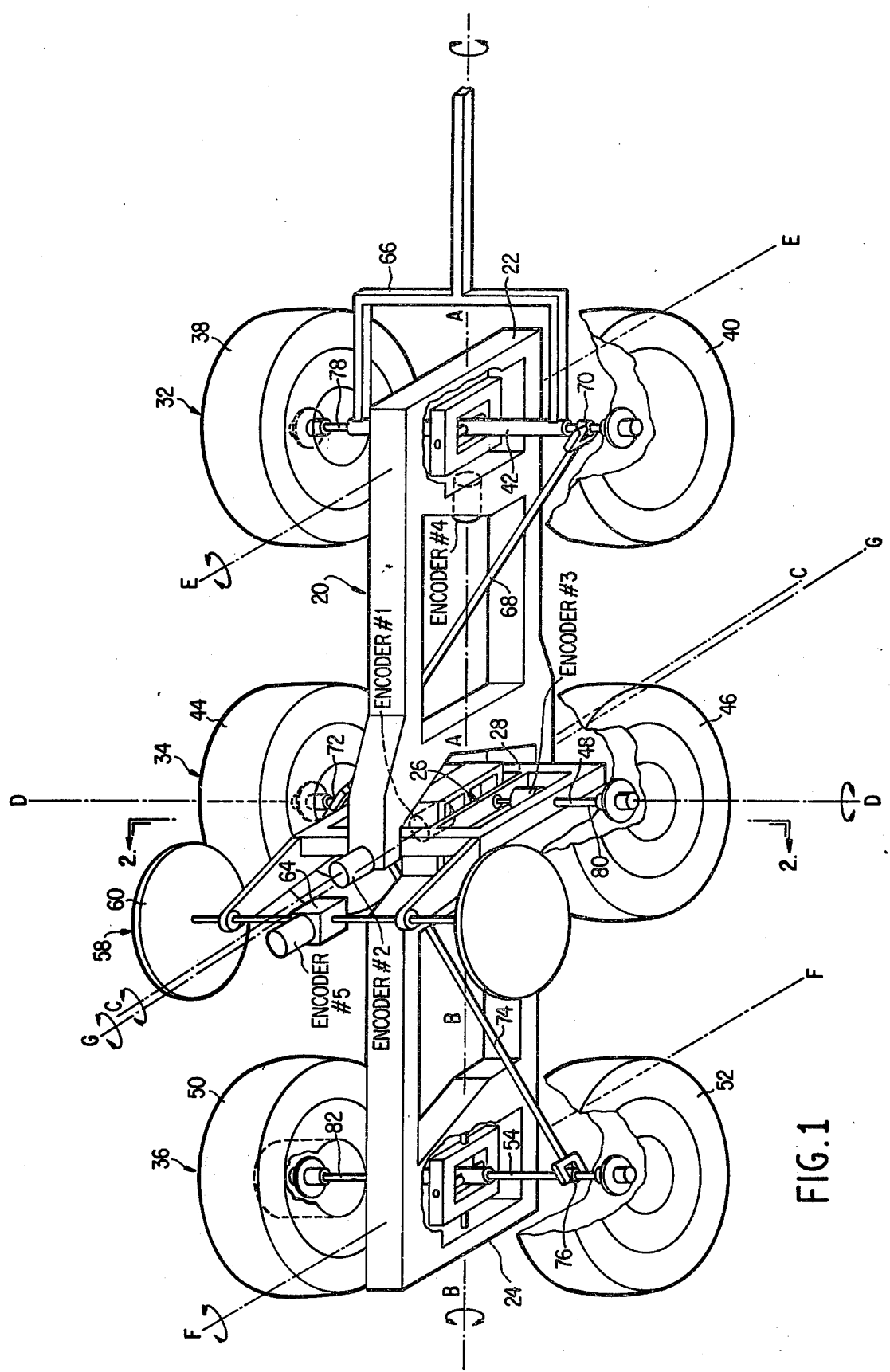
FIG. 1 is a pictorial view in partial cross-section of an electromechanical survey vehicle embodiment of the present invention.

Referring to FIG. 1, an electromechanical survey vehicle embodiment of the present invention is denoted generally by the numeral 20. The vehicle includes a first member or front main member 22, having a reference axis A—A, adapted to be movably supported on the surface to be surveyed. A second or rear main member 24, having a reference axis B—B, is likewise adapted to be movably supported on the surface to be surveyed. The first and second members are articulated end to end for movement relative to one another. This articulation may be accomplished by coupling the members 22 and 24 to gimbal structure 26 through a gimbal frame 28 so that the first and second members are pivotable with respect to each other about first axes C—C and G—G and a second, nonparallel axis, D—D. (The axis C—C is coaxial with Encoder #2; the axis G—G is coaxial with Encoder #1; the axis D—D is coaxial with Encoder #3.) In the preferred embodiment of the invention, the first axes C—C and G—G are generally perpendicular to the second axis D—D.

In an alternate embodiment of the invention the first and second members may be pivotable about only axis C—C or G—G and Encoders #1 and #2 may be replaced with a single encoder which measured the sum of the angles measured by Encoders #1 and #2.

The survey vehicle embodiment of FIG. 1 may include means for measuring the angular orientation of the first member 22 and the second member 24 with respect to a gimbal frame 28 in a plane perpendicular to the axes C—C and G—G. Such a measuring means may include Encoder #1 and Encoder #2 located along the first axes C—C and G—G. In the preferred embodiment, Encoders #'s 1 and 2 are optical angular encoders such as the Itek-RI 35, marketed by Itek Measurement Systems. Similarly, Encoder #3 may be provided to measure angular changes in orientation between the first member 22 and the second member 24 in a plane perpendicular to the second axis D—D.

The first member 22 and the second member 24 may be supported on the surface by a first wheel means 32, a second wheel means 34, and a third wheel means 36. In an alternate embodiment, the members could be supported by other means such as ground engaging skids. The first wheel means 32 may include a first wheel 38 and a second wheel 40 coaxially mounted on a first axle. The first axle 42 may be mounted to the first member 22 for pivoting about the axis A—A so that both wheels 38 and 40 may remain in contact with uneven terrain. Changes in the orientation of the first axle 42 with respect to the first member 22 in a plane perpendicular to the axis A—A may be measured by Encoder #4 which may be of the type previously described. The axle 42 may be pivotable about an axis E—E, to facilitate steering of the vehicle.

The second wheel means 34 may include a first wheel 44 and a second wheel 46 coaxially mounted on a split second axle 48 which may be coupled to the gimbal frame 28. The third wheel means 36 may include a first wheel 50 and a second wheel 52 coaxially mounted on a third axle 54. The third axle may be mounted to the second member 24 for pivoting about axis B—B and about axis F—F in a manner similar to the first axle.

The distance traveled by the vehicle 20 may be measured by an odometer device 58 coupled to one or more of the vehicle wheels. The odometer 58 may include at least one idler wheel 60 rotated by movement of the second wheel means 34. The rotary motion of the idler wheel 60 may be transmitted by a mechanical transmission device 64 to Encoder #5 which may be an optical angular encoder, similar to the encoders previously described.

The survey vehicle 20 may be pulled along a path on the surface to be surveyed by means of a tow bar 66 coupled to the first axle 42. The second wheel means 34 and third wheel means 36 may be coupled to the first wheel means 32 so that the second and third wheel means track the first wheel means as the vehicle moves along a path on the surface. This tracking function may be facilitated by coupling the first wheel means 32 to the second wheel means 34 by a first connecting member 68 pivotably attached to a first end portion 70 of the first axle 42 and pivotably attached to an end portion 72 of the second axle 48 on the opposite side of the vehicle from the end portion 70. To facilitate tracking, the pivotable attachment of the member 68 to the end portion 70 should be approximately the same distance from the axis A—A measured along the axis of the axle 42 as the distance of the attachment to the end portion 72 is from the axis A—A measured along the axis D—D. The second wheel means 34 may be coupled to the third wheel means 36 by means of a second connecting member 74 pivotably attached to the end portion 72 of the second axle member 48 and pivotably attached to an end portion 76 of the third axle member 54 on the opposite side of the vehicle from the end portions 72. Similarly, to facilitate tracking, the pivotable attachment of the member 74 to the end portion 72 should be approximately the same distance from the axis A—A measured along the axis D—D, as the distance of the attachment to the end portion 76 is from the axis B—B measured along the axis of the axis 54. Alternatively, a first additional connecting member (not shown) may be provided to couple end 78 of the first axle member 42 and end 80 of the second axle member 48. A second additional connecting member (not shown) may be provided to connect the end 80 of the second axle member 48 to an end 82 of the third axle member 54. The points of attachment of the additional members may be bilaterally symmetrical to those of the members 72 and 74. By use of the additional connecting members the stability and structural strength of the survey vehicle may be enhanced.

Figure 2:
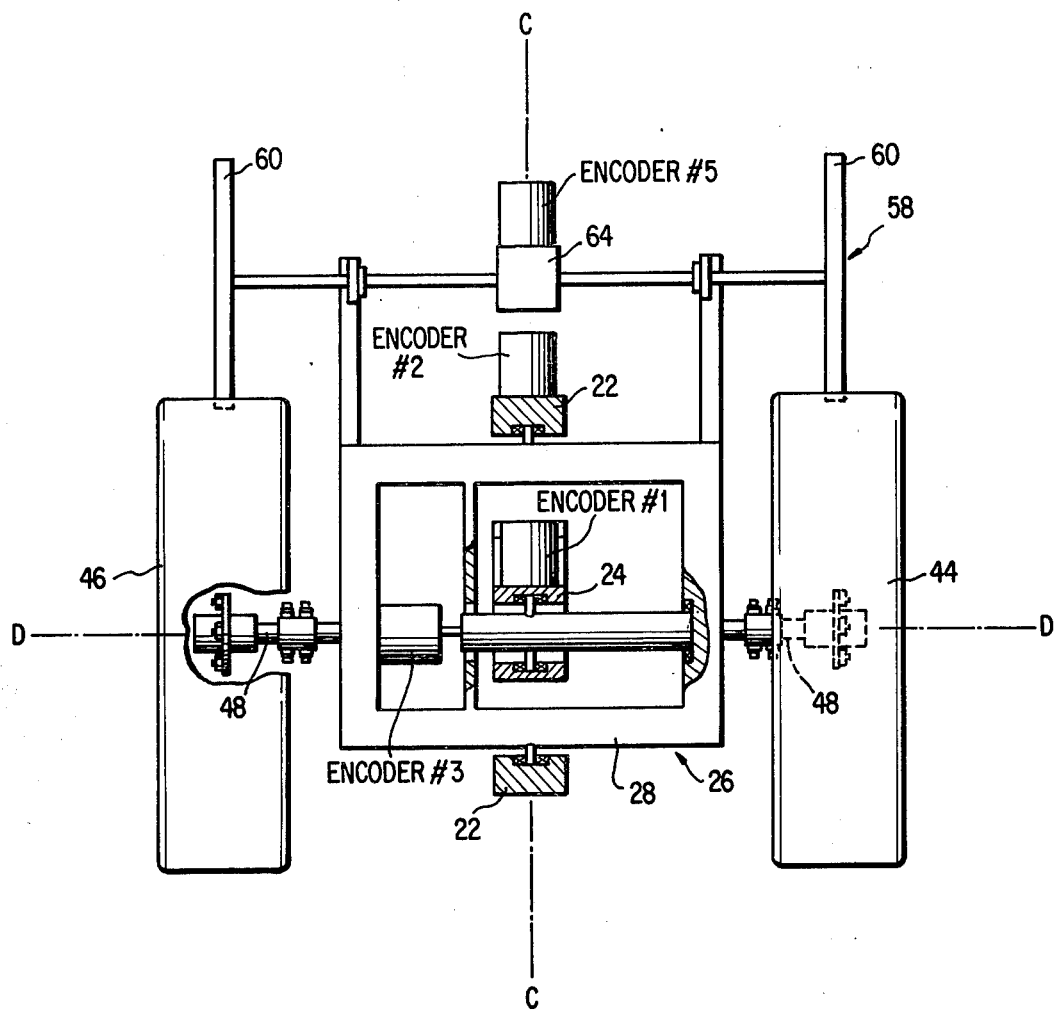
FIG. 2 is a cross-sectional view of the embodiment of FIG. 1 taken along line 2—2.

FIG. 2 is a cross-sectional view of the embodiment of FIG. 1 taken along the line 2—2 wherein features of the vehicle are identified with the same reference numerals as used in FIG. 1. The first or front main member 22 is pivotably mounted to the second or rear main member 24 by means of the gimbal structure 26 for pivoting about axes C—C, G—G and D—D. The split second axle 48 may be attached to the gimbal frame 28. The wheels 44 and 46 may be pivotably mounted to the axle segments 48 of the second axle for rotation about the axis D—D. Changes in the angular orientation of the first member 22 with respect to the second member 24 in a plane perpendicular to the axis C—C and G—G may be measured by Encoders #1 and #2.

Changes in angular orientation of the first member 22 with respect to the second member 24 in a plane perpendicular to the axis D—D may be measured by Encoder #3.

The distance through which the vehicle is moved may be measured by the odometer 58. The odometer 58 may include the idler wheels 60 mechanically coupled by the transmission device 64 to Encoder #5. It will be understood that rotation of the wheels 44 and 46 will in turn rotate the idler wheels 60, which rotation will be measured by Encoder #5.

II. DETERMINATION OF LOCATIONAL COORDINATES FROM DATA MEASURED ON THE SURVEY VEHICLE CHASSIS

A method for determining locational coordinates of a survey path from data measured by the above-described vehicle chassis will now be described in connection with FIGS. 3a–c through 5a–c. The Figures are sequential schematic views of a survey vehicle 200, such as that discussed in connection with FIGS. 1 and 2, moving along an arbitrary path 202 on the surface to be surveyed Parts a, b and c of each of FIGS. 3–5 are pictorial, plan, and side views, respectively, of the vehicle in the same position. Thus, for example, FIGS. 3a, 3b and 3c are merely different views of the vehicle in the same position. In FIG. 3a, the survey vehicle 200 is shown in an initial position. In this position, locational parameters of the vehicle are measured, for example, by conventional surveying techniques. The three-dimensional coordinates of a reference point on the vehicle such as point $X_1$, $Y_1$, $Z_1$ may be determined from the measured locational parameters. The locational parameters may also be sufficient to determine the orientation of axis B—B of a second member 216 of the vehicle with respect to a reference coordinate system. Such information may be obtained, for example, by measuring the X and Y coordinates of point 206 and measuring the elevations of each of wheels 212, 214, 222 and 224.

While the vehicle 200 is in its initial position, measurements are taken from the optical angular encoders to determine the orientation of the axis A—A of the first member 204 with respect to the axis B—B of the second member 216. This may be accomplished, as illustrated in FIG. 3b, by measuring the angular orientation of the first member 204 with respect to the second member 216 in the plane of FIG. 3b. Similarly, as shown in FIG. 3c, the angular orientation between the first member 204 and the second member 216 may be measured in a plane generally perpendicular to that of FIG. 3b.

It will be readily apparent that the three-dimensional coordinates of the point $X_2$, $Y_2$, $Z_2$, may be determined from the measured locational parameters of the second member in its initial position and from the measured changes in the angular orientation of the first member with respect to the second member in the planes of FIGS. 3b and 3c.

Once the initial measurements are taken, the vehicle 200 may be moved a predetermined distance to the position shown in FIG. 4a. The predetermined distance is the length of the first member 204. The vehicle is moved in such a way that wheels 212 and 222 will follow closely in the path of wheel 208 and wheels 214 and 224 will follow closely in the path of wheel 210. The second member 216 is substantially the same length as the first member 204. Thus, after the vehicle is moved the predetermined distance equal to the length of one of the members, wheels 212, 214, 222, and 224 will be located nearly exactly on the spots where wheels 208, 210, 212 and 214 were located in the initial position. It follows that the second member 216 will then be located in the same position as the first member 204 was before the vehicle was moved. After the vehicle has moved the predetermined distance, changes in the orientation of the first member 204 with respect to the second member 216 may be measured. These angular changes are illustrated in FIGS. 4b and 4c. It will be readily apparent that the three-dimensional coordinates of the point $X_3$, $Y_3$, $Z_3$, may be determined from the measured locational parameters of the first member in its initial position and from the measured changes in the angular orientation of the first member with respect to the second member in the planes of FIGS. 4b and 4c.

In the same fashion, the vehicle may again be moved forward from the position in FIG. 4a, a distance equal to the length of one of the members, so that it is located as shown in FIG. 5a. Once again, changes in the angular orientation of the first member 204 with respect to the second member 216 may be measured. From these measurements the three-dimensional coordinates of the point $X_4$, $Y_4$, $Z_4$, may be determined.

It will be readily understood that the projections of points $X_2$, $Y_2$, $Z_2$; $X_3$ $Y_3$, $Z_3$; and $X_4$, $Y_4$, $Z_4$, on the surface of the path 202 may be calculated by taking into account the dimensions of the wheels and orientations of the axles. In this manner the vehicle may be employed to provide data for calculating the three-dimensional coordinates of a series of points, spaced at regular intervals along the survey path 202.

It should be noted that the exact orientations of the second and third axles of the vehicle will be determined by the connecting or steering members 68 and 74 of FIG. 1 and the response of the vehicle as it proceeds along the path over the terrain. No attempt has been made to exactly depict the orientations of the axles in the examples of FIGS. 3–5.

It will also be understood that the measurements of the change in orientation of the first and second members may be made automatically each time the vehicle moves the predetermined distance so that the vehicle may provide survey data while being moved continuously along any arbitrary path.

III. A DEVICE FOR RECORDING DATA MEASURED ON THE PREFERRED EMBODIMENT OF THE SURVEY VEHICLE

A portable battery-powered recording system may be provided to record the data obtained by the optical angular encoders of the survey vehicle described in connection with FIGS. 1 and 2. The recording device may be used to record data in two different modes: automatic and manual. In the automatic mode digital data from Encoders #1, #2, #3, and #4 are stored whenever Encoder #5 indicates that the vehicle has moved a predetermined distance equal to the length of one of the members 22 and 24. Advantageously, a coupling may be provided between the wheels 44 and 46, such that Encoder #5 passes through its zero point each time the vehicle is moved the predetermined distance. In the manual mode, data from all five encoders are stored by manual actuation of a switch on the data recording device.

FIG. 6 is a schematic block diagram of a data recording device which may be used to record data provided by a survey vehicle such as described in connection with FIGS. 1 and 2. The device may include circuitry for registering the actual angular position of Encoders #1, #2, #3, and #4 and for sequentially storing on tape the digital signals related in value to the angular positions at predetermined intervals along the survey path.

Encoders #1, #2, #3, #4, and #5 are incremental and therefore each requires up/down counters 250 to register their position. On command from the control circuit 252, data readings from each of the up/down counters are placed on the data buses 254. The control circuit 252 also controls the loading of data from the data buses 254 into either a first FIFO stack 256 or a second FIFO stack 258, on a first-in first-out basis. Data loaded in the FIFO stacks 256 and 258 is supplied to permanent storage 260 which may include for example, a cassette tape recorder for sequentially recording the data. A manual preset control 262 may be used for entering the initial locational parameters of the vehicle measured by conventional techniques.

FIG. 7 is a schematic block diagram illustrating details of the data recording device shown in FIG. 6. In order to simplify discussion of the data recording device, only the circuitry associated with Encoder #1 is shown in the figure.

Three output signals are produced by each of the encoders: a zero-point signal, a clockwise signal and a counterclockwise signal. A zero-indicator such as zero-indicator 264 may be provided to indicate when the zero-point has been passed. The zero-indicator 264 is shown in greater detail in FIG. 8. The three output signals from the encoder 29 may be applied to the up/down counter 266. In operation, each of the five encoders are manually rotated through their zero-points to initialize their respective counters. Once this has been accomplished, the incrementing and decrementing output signals of the encoders (CW, CCW) are counted by the up/down counter which then provides a digital signal related in value to the angular position of the encoder. When the distance measuring Encoder #5 passes through its zeropoint, the control circuit 268 applies a LOAD signal to the up/down counters such as the counter 266. The LOAD signal causes the signal related in value to the angular position of each of the encoders to be loaded in bit registers associated with each of the up/down counters.

A DATA ENTER signal from the control circuit 268 may be sequentially applied to each of the up/down counters. Responsive to the DATA ENTER signal, the up/down counters may place the signal stored in their associated bit registers on data buses 1 through 15 (DB1 - DB15).

The control circuit 268 may provide a CLOCK signal to one of the FIFO stacks 256 and 258 which enables the FIFO stack to store the data on the data buses on a first-in first-out basis. The control circuit may also provide a READ signal to the other of the FIFO stacks which causes the FIFO stack to provide a data signal to write control section 270. The write control section 270 may apply the data signal to the tape heads of a digital cassette recorder 272. The write control section also controls the tape transport of the digital cassette recorder 272.

Initial locational coordinates of the vehicle may be entered into permanent storage by means of the manual preset and enter circuit 274. The manual preset and enter circuit may include four digital switches for applying a data signal to the data buses DB1 - DB15. The signals provided by the manual preset and enter circuit 274 may be stored by the digital cassette record 272.

An end control circuit 276 may be provided. Actuation of the end control circuit 276 may cause the remaining data in the FIFO stacks to be recorded by the digital cassette recorder 272 and permit the rewinding of the tape.

FIG. 8 is a schematic diagram of a zero indicator and an up/down counter such as may be employed in the data recording device of FIG. 6. The output signals from one of the angular encoders is applied to the terminals ZERO, CW and CCW. The ZERO POINT signal from each of the encoders is applied to the ZERO terminal of its respective up/down counter. A light emitting diode 280 provides a visible indication when the encoder has passed its zero point. The ZERO POINT signal is also operative to initialize up/down counter integrated circuits 282.

The CW and CCW signals from the encoder are applied to increment and decrement the counters 282 responsive to rotation of the encoders. A digital signal, related in value to the instantaneous angular position of the encoder may be loaded into bit register integrated circuits 284 responsive to a LOAD signal received from the control circuit of the device. The digital signal stored in the shift register integrated circuit 284 may be applied to data buses 1 through 15 responsive to a DATA ENTER signal applied to the up/down counter circuit by the control circuit.

FIG. 9 is a schematic diagram of a portion of a FIFO stack circuit such as may be employed in the FIFO stacks 256 and 258 of FIG. 6. Responsive to a CLOCK signal from a control circuit, data signals on data buses 1 through 15 are entered on quad 64 bit shift registers 286. Responsive to a READ signal from the control circuit, data stored in the shift register 286 is sequentially read out of the FIFO stack on a first-in first-out basis.

FIG. 10 is a schematic diagram of a control circuit such as may be employed in the data recording device of FIG. 6. The control circuit may include a timing sub-circuit 288 for sequencing data acquisition and storage in the device. An up/down counter control circuit 290 may provide the LOAD and DATA signals responsive to either a manual STORE signal or a ZERO POINT signal from the fifth encoder. A FIFO stack control circuit 292 sequences the reading and storing of data into and out of the two FIFO stacks. Data read from the FIFO stacks is applied to the write control circuit.

FIG. 11 is a schematic diagram of a write control circuit such as may be employed in the data recording device of FIG. 6. A zero sensing sub-circuit 294 provides a READY signal responsive to ZERO POINT signals from the five encoders. A sub-circuit 296 of the write control circuit includes a timing circuit to phase and code the tape head. Sub-circuit 296 provides the data signal to the tape head. A second sub-circuit 298 controls the speed and direction of the tape transport.

The following are descriptions of the integrated circuit units employed in the various circuits shown in FIGS. 8–11.

| Identification No. | Description |
|---|---|
| 4009 | Quad 2 Input Nor |
| 4011 | Quad 2 Input Nand |
| 4013 | Dual D Flip Flop |
| 4014 | 8 Bit Shift Register |
| 4017 | Decade Counter |
| 4019 | Quad And/Or Select |
| 4022 | Octal Counter |
| 4024 | 7 Stage Ripple Counter |
| 4029 | Up/Down Counter |
| 4040 | 12 Bit Binary Counter |
| 4047 | Monostable Multivibrator |
| 4049 | Hex Buffer |
| 4076 | 4 Bit Register |
| 4731 | Quad 64 Bit Shift Register |

It will be understood that other systems may be devised to measure and store the orientational data provided by the survey vehicle of the present invention. The system described in connection with FIGS. 6–11 is presented only as an illustrative example of a system which may be used in conjunction with the preferred embodiment of the survey vehicle illustrated in FIGS. 1 and 2.

IV. PROCESSING OF DATA MEASURED BY THE PREFERRED EMBODIMENT OF THE SURVEY VEHICLE TO CALCULATE LOCATIONAL COORDINATES ALONG THE SURVEY PATH

Data recorded on tape by the above described recording device may be read by a general purpose digital computer and processed to calculate locational coordinates along the survey path. The following computation steps may be used to calculate the locational coordinates.

In order to properly accomplish the computations utilizing the angular and locational information, the data must be changed into a directly useable form. The first 17 steps, of the following program facilitate the entering of data and checking the validity of a part of this data. The following outline of computation steps includes all computation steps for data relating to the initial location of the survey vehicle and data relating to orientation of the front main member (FMM) and rear main member (RMM) at locations spaced the predetermined distance along the path of the vehicle. Some computation steps apply only to the initial station, other only to following automatic stations, and most to both.

| Computation Steps for Initial Station | | |
|---|---|---|
| Computation Step No. | | Memory Address |
| 1 | Store Encoder #1 angle (E1) with + or − sign in | 1 |
| 2 | Store angle α with + or − sign in (The angle α refers to the angle between the principal axis of the RMM and the horizontal. Initial field leveling information of the middle, and rear axles is easily converted into the initial angle α. The elevation of the ends of the middle axle are averaged to determine the elevation of the front end of the RMM. The elevations of the ends of the rear axle are averaged to determine the elevation of the rear end of the RMM. The difference in elevation between the front and rear ends of the RMM divided by the length of the RMM equals the sine of angle α, from which angle α is determined and entered as computation Step 2.) | 2 |
| 3 | Store angle β with + or − sign in (The angle β refers to the angle between the principal axis of the second or middle axle and the horizontal. Initial field leveling information of the middle axle is easily converted into the initial angle β. The difference in elevation of the ends of the middle axle divided by the axle length between the axle ends equals the sine of angle β, from which angle β is determined and entered as computation Step 3. A positive angle is clockwise from horizontal when viewed from the rear of the chassis and a negative angle is counter clockwise from horizontal when viewed from the rear of the chassis.) | 3 |
| 4 | Store Encoder #3 angle (E3) with + or − sign in | 4 |
| 5 | Store Encoder #2 angle (E2) with + or − sign in | 5 |
| 6 | Store initial Z value in (The elevation of the center of the middle axle frame, the front "end" of the RMM, and the rear "end" of the FMM, which are all the same common point, is determined by averaging the field determined elevations of the ends of the middle axle frame and entered as the initial Z value in computation Step 6.) | 6 |
| 7 | Store Encoder #4 angle (E4) with + or − sign in | 7 |
| 8 | Store initial X coordinate in | 8 |
| 9 | Store initial Y coordinate in (The initial X and Y coordinates of the center of the middle axle frame, the front "end" of the RMM, and the rear "end" of the FMM which are all the same common point, is determined by placing this point of the chassis over a point on the surface being negotiated, whose X and Y coordinate values are then entered as computation Steps 8 and 9.) | 9 |
| 10 | Store azimuth of Rear Main Member (RMM) in (The azimuth of the RMM is determined in the field at the initial station by standard surveying procedures and entered as computation Step 10. This is the clockwise angle in degrees from north, of the RMM observed from the back toward the front.) | 10 |
| 11 | Store the length of a main member in | 11 |
| 12 | Store station identification from computer keyboard entry in | 12 |
| 13 | Store station identification from field entry onto data tape in | 13 |
| 14 | Store Encoder #5 value in | 14 |
| 15 | Store initial station of 00, 000.000 in | 15 |
| 16 | Compare station identifications from Steps 12 and 13 to determine if they are the same | 16 |
| 17 | Check if Encoder #5 value from Step 14 is zero | 17 |
| 18 | Determine the cosine of 1, to | 18 |
| 19 | Determine the sine of α, sine of 2, to Steps 20 through 23 are skipped at the initial station | 19 |

-continued

| Computation Steps for Initial Station | | |
|---|---|---|
| Computation Step No. | | Memory Address |
| 24 | Determine the sine of 3, to Steps 25 and 26 are skipped at the initial station | 24 |
| 27 | Determine the cosine of 3, to | 27 |
| 28 | Divide 19 by 27, to | 28 |
| 29 | Determine the sine of 1, to | 29 |
| 30 | Determine the tangent of 3, to | 30 |
| 31 | Multiply 29 times 30, to | 31 |
| 32 | Algebraically subtract 31 from 28, to | 32 |
| 33 | Divide 32 by 18, to | 33 |
| 34 | Determine the angle whose sine is 33, to | 34 |
| 35 | Divide 29 by 27, to | 35 |
| 36 | Multiply 19 times 30, to | 36 |
| 37 | Algebraically subtract 36 from 35, to | 37 |
| 38 | Determine the cosine of 2, to | 38 |
| 39 | Divide 37 by 38, to | 39 |
| 40 | Determine the angle whose sine is 39, to | 40 |
| 41 | Algebraically add 34 and 4, to | 41 |
| 42 | Determine the cosine of 5, to | 42 |
| 43 | Determine the sine of 41, to | 43 |
| 44 | Multiply 42 times 43, to | 44 |
| 45 | Determine the sine of 5, to | 45 |
| 46 | Multiply 45 times 30, to | 46 |
| 47 | Algebraically subtract 46 from 44, to | 47 |
| 48 | Multiply 47 times 27, to | 48 |
| 49 | Multiply 48 times 48, to | 49 |
| 50 | Subtract 49 from 1.0000000, to | 50 |
| 51 | Determine the square root of 50, to | 51 |
| 52 | Multiply 48 times 11, to | 52 |
| 53 | Multiply 51 times 11, to | 53 |
| 54 | Divide 45 by 27, to | 54 |
| 55 | Multiply 47 times 24, to | 55 |
| 56 | Algebraically add 54 and 55, to | 56 |
| 57 | Divide 56 by 51, to | 57 |
| 58 | Determine the angle whose sine is 57, to | 58 |
| 59 | Algebraically add 53 and 15, to | 59 |
| 60 | Algebraically add 10, and 40, and 58, to | 60 |
| 61 | Determine the sine of 60, to | 61 |
| 62 | Multiply 53 times 61, to | 62 |
| 63 | Determine the cosine of 60, to | 63 |
| 64 | Multiply 53 times 63, to | 64 |
| 65 | Algebraically add 62 and 8, to | 65 |
| 66 | Algebraically add 64 and 9, to | 66 |
| 67 | Algebraically add 52 and 6, to | 67 |
| 68 | Multiply 45 times 48 to | 68 |
| 69 | Algebraically add 68 and 24, to | 69 |
| 70 | Divide 69 by 42, to | 70 |
| 71 | Determine the angle whose sine is 70, to | 71 |
| 72 | Determine the tangent of 71, to | 72 |
| 73 | Multiply 72 times 51, to | 73 |
| 74 | Determine the angle whose tangent is 73, to | 74 |
| 75 | Algebraically add 74 and 7, to | 75 |
| 76 | Determine the tangent of 75, to | 76 |
| 77 | Divide 76 by 51, to | 77 |
| 78 | Determine the angle whose tangent is 77, to | 78 |
| 79 | Print in this order as a group, 12, 15, 6, 8, and 9 and store as a block of output | |
| 80 | Print in this order as a group, 59, 67, 65, and 66 and store as a block of output | |

With initial and second station information computed, printed out, and stored in memory, the initial station computations are complete.

| Computation Steps for Subsequent Locations (For both manually selected stops and locations automatically selected by movement of the vehicle through the predetermined distance) | | |
|---|---|---|
| Computation Step No. | | Memory Address |
| 1 | Store Encoder #1 angle (E1) with + or − sign in | 1 |
| 2 | Not used, as needed trig functions are available from last station computations | |
| 3 | This remains blank until 26 is complete and β has been removed, to | 3 |
| 4 | Store Encoder #3 angle (E3) with + or − sign, in | 4 |
| 5 | Store Encoder #2 angle (E2) with + or − sign, in | 5 |
| 6 | Move Z from Step 67, of last station, to | 6 |
| 7 | Store Encoder #4 angle (E4) with + or − sign, in | 7 |
| 8 | Move X coordinate from Step 65, of last station, to | 8 |
| 9 | Move Y coordinate from Step 66, of last station, to | 9 |
| 10 | Move azimuth of Rear Main Member (RMM) from Step 60 of last station, to | 10 |
| 11 | Keep the length of a main member in in this step | 11 |
| 12 | Is not used | |
| 13 | At selected stops ONLY, store identification from field entry onto data tape, in | 13 |
| 14 | At selected stops ONLY, store Encoder #5, value, in | 14 |
| 15 | Move stationing from Step 59, of last station, to | 15 |
| 16 | Is not used | |
| 17 | Move Step 78, of last station, to | 17 |
| 18 | Determine the cosine of 1, to | 18 |
| 19 | Move sine α from Step 48 of last station, to | 19 |
| 20 | Determine the tangent of 1, to | 20 |
| 21 | Multiply 20 time 19, to | 21 |
| 22 | Determine the sine of 17, to | 22 |
| 23 | Algebraically add 22 and 21, to | 23 |
| 24 | Multiply 18 times 23, to | 24 |
| 25 | Determine the angle whose sine is 24, to | 25 |
| 26 | Move 25, to | 3 |
| 27 | Determine the cosine of 3, to | 27 |
| 28 | Divide 19 by 27, to | 28 |
| 29 | Determine the sine of 1, to | 29 |
| 30 | Determine the tangent of 3, to | 30 |
| 31 | Multiply 29 times 30, to | 31 |
| 32 | Algebraically subtract 31 from 28, to | 32 |
| 33 | Divide 32 by 18, to | 33 |
| 34 | Determine the angle whose sine is 33, to | 34 |
| 35 | Divide 29 by 27, to | 35 |
| 36 | Multiply 19 times 30, to | 36 |
| 37 | Algebraically subtract 36 from 35, to | 37 |
| 38 | Move Step 51, of last station to | 38 |
| 39 | Divide 37 by 38, to | 39 |
| 40 | Determine the angle whose sine is 39, to | 40 |
| 41 | Algebraically add 34 and 4, to | 41 |
| 42 | Determine the cosine of 5, to | 42 |
| 43 | Determine the sine of 41, to | 43 |
| 44 | Multiply 42 times 43, to | 44 |
| 45 | Determine the sine of 5, to | 45 |
| 46 | Multiply 45 times 30, to | 46 |
| 47 | Algebraically subtract 46 from 44, to | 47 |
| 48 | Multiply 47 times 27, to | 48 |
| 49 | Multiply 48 times 48, to | 49 |
| 50 | Subtract 49 from 1.0000000, to | 50 |
| 51 | Determine the square root of 50, to | 51 |
| 52 | Multiply 48 times 11, to | 52 |
| 53 | Multiply 51 times 11, to | 53 |
| 54 | Divide 45 by 27, to | 54 |
| 55 | Multiply 47 times 24, to | 55 |
| 56 | Algebraically add 54 and 55, to | 56 |
| 57 | Divide 56 by 51, to | 57 |
| 58 | Determine the angle whose sine is 57, to | 58 |
| 59 | Algebraically add 53 and 15, to | 59 |
| 60 | Algebraically add 10, and 40, and | 60 |

-continued

Computation Steps for Subsequent Locations
(For both manually selected stops and locations automatically selected by movement of the vehicle through the predetermined distance)

| Computation Step No. | | Memory Address |
|---|---|---|
| | 58, to | |
| 61 | Determine the sine of 60, to | 61 |
| 62 | Multiply 53 times 61, to | 62 |
| 63 | Determine the cosine of 60, to | 63 |
| 64 | Multiply 53 times 63, to | 64 |
| 65 | Algebraically add 62 and 8, to | 65 |
| 66 | Algebraically add 64 and 9, to | 66 |
| 67 | Algebraically add 52 and 6, to | 67 |
| 68 | Multiply 45 times 48, to | 68 |
| 69 | Algebraically add 68 and 24, to | 69 |
| 70 | Divide 69 by 42, to | 70 |
| 71 | Determine the angle whose sine is 70, to | 71 |
| 72 | Determine the tangent of 71, to | 72 |
| 73 | Multiply 72 times 51, to | 73 |
| 74 | Determine the angle whose tangent is 73, to | 74 |
| 75 | Algebraically add 74 and 7, to | 75 |
| 76 | Determine the tangent of 75, to | 76 |
| 77 | Divide 76 by 51, to | 77 |
| 78 | Determine the angle whose tangent is 77, to | 78 |
| 79 | Is not used | |
| 80 | Print in this order as a group, 59, 67, 65, and 66 and store as a block of output | |

This provides for complete computations for all locations following the second location. The foregoing computations may be employed to provide the X, Y, and Z coordinates of a series of points, spaced apart the predetermined distance, along the path of the survey vehicle.

The principles, preferred embodiments, and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. A method for surveying a surface to determine three dimensional coordinates in a reference coordinate system of points along a path on the surface, comprising the steps of:
   providing a survey vehicle including a first and a second member movably supported on the surface, the members being pivotable with respect to each other about a first axis and a second axis, nonparallel to the first axis;
   measuring locational parameters of the vehicle in an initial position sufficient to determine the three dimensional coordinates of a reference point on the first member and the orientation of the first member with respect to the reference coordinate system;
   measuring a first angle between the first and second members in a plane perpendicular to the first axis;
   measuring a second angle between the first and second members in a plane perpendicular to the second axis;
   moving the vehicle a predetermined distance so that the second member is located in at least approximately the initial position of the first member;
   measuring the change in angle between the first and second members in the plane generally perpendicular to the first axis responsive to the vehicle having been moved the predetermined distance;
   measuring the change in angle between the first and second members in the plane generally perpendicular to the second axis responsive to the vehicle having been moved the predetermined distance; and
   determining the three dimensional coordinates of the survey path from the measured angles and changes in angles between the first and second members and from the measured locational parameters of the vehicle at the initial position.

2. The method of claim 1, further comprising the steps of:
   continuously moving the vehicle along the path;
   repetitively measuring the changes in angle between the first and second members in the plane generally perpendicular to the first axis responsive to the vehicle having been moved the predetermined distance;
   repetitively measuring the changes in angle between the first and second members in a plane generally perpendicular to the second axis responsive to the vehicle having been moved the predetermined distance; and
   determining the three dimensional coordinates of the reference point at locations spaced the predetermined distance along the path on the surface, from the measured angles and the measured changes in angles and from the measured locational parameters of the vehicle at the initial position.

3. A surveying vehicle comprising:
   a first member movably supported on a surface;
   a second member movably supported on the surface, said second member being pivotable with respect to said first member about a first axis and a second axis, nonparallel to the first axis;
   means for generating a first signal responsive to the vehicle having been moved a predetermined distance; and
   means for measuring, responsive to said first signal, changes in angular orientation of said second member with respect to said first member about said first and second axes;
   wherein, as the vehicle is moved along a path on the surface, data is provided from which three dimensional coordinates of the path are calculated.

4. The apparatus of claim 3 wherein said measuring means provides a first data signal related in value to an angular change in orientation of said first and second members in a plane generally perpendicular to the first axis and a second data signal related in value to an angular change in orientation of said first and second members in a plane generally perpendicular to the second axis and, further including means for recording said first and second data signals.

5. The apparatus of claim 4 wherein said members are elongated and articulated end to end and further including:
   first wheel means for supporting a leading end of said first member on the surface;
   second wheel means for supporting the articulated ends of said members on the surface; and
   third wheel means for supporting a trailing end of said second member on the surface; wherein said first wheel means is located approximately the predetermined distance from said second wheel means and wherein said second wheel means is located approximately the predetermined distance from said third wheel means.

6. The apparatus of claim 5 wherein said first wheel means includes a pair of coaxially, rotatably mounted leading wheels, the axis of rotation of said wheels being pivotable about an axis generally perpendicular to both the axis of rotation and said first axis, and further comprising means for measuring, responsive to said first signal, changes in orientation of the axis of rotation of said leading wheels.

7. The apparatus of claim 6 wherein said third wheel means includes a pair of coaxially, rotatably mounted trailing wheels, the axis of rotation of said wheels being pivotable about an axis generally perpendicular to both the axis of rotation and said second axis.

8. The apparatus of claim 7 wherein said second wheel means includes a pair of coaxially, rotatably mounted wheels.

9. The apparatus of claim 8 wherein:
said pair of wheels of said first wheel means are rotatably mounted on a first axle member;
said pair of wheels of said second wheel means are rotatably mounted on a second axle member;
said pair of wheels of said third wheel means are rotatably mounted on a third axle member; and
said first axle member is steerable by pivoting about an axis generally perpendicular to the surface.

10. The apparatus of claim 9 wherein said second and third axle members each are pivotable about an axis generally perpendicular to the surface.

11. The apparatus of claim 10 wherein:
said second axle member is coupled to said first axle member for pivoting said second axle member responsive to pivoting of said first axle member, the direction of pivoting of said second axle member being opposite the direction of pivoting of said first axle member; and
wherein said third axle member is coupled to said second axle member for pivoting said third axle member responsive to pivoting of said second axle member, the direction of pivoting of said third axle member being opposite the direction of pivoting of said second axle member.

12. The apparatus of claim 7 wherein said measuring means are optical angular encoders.

13. The apparatus of claim 8 wherein said means for generating the first signal responsive to the vehicle having moved the predetermined distance is an optical angular encoder coupled to said second wheel means.

14. A survey vehicle apparatus for providing survey data for a path on a surface along which the vehicle is moved, comprising:
a first member supported by at least one surface engaging wheel, said first member having a reference axis;
a second member, having a reference axis and supported by at least one surface engaging wheel;
means for coupling said first member to said second member to permit the orientation of the reference axes to vary responsive to changes in direction of the vehicle and changes in the elevation of the surface, encountered in movement along the surface; and
means for measuring changes in the orientation of the reference axes of the first and second members with respect to one another.

15. The apparatus of claim 14 further comprising means for steering the surface engaging wheels so that said second member approximately tracks said first member.

16. The apparatus of claim 15 wherein said measuring means measures changes in the orientation of the reference axes responsive to the vehicle having moved a predetermined distance.

17. The apparatus of claim 16 wherein the predetermined distance is equal to a distance which the vehicle must be moved from an initial position in order that said second member be supported on approximately the same portion of the surface as the first member was supported on, when the vehicle was in the initial position.

18. The apparatus of claim 15 wherein said first and second members are coupled by a gimbal.

19. The apparatus of claim 18 wherein said first and second members are supported on the surface by:
a first pair of wheels coaxially mounted on a first axle member, said axle member being mounted to said first member for pivoting about two perpendicular axes;
a second pair of wheels coaxially mounted on a second axle member coupled to said gimbal;
a third pair of wheels coaxially mounted on third axle member, said axle member being mounted to said second member for pivoting about two perpendicular axes.

20. The apparatus of claim 19 further comprising: means connected to said first axle member for measuring changes in orientation between a principal axis of said first axle member and said first member.

21. The apparatus of claim 20 further comprising means for recording the measured changes in the orientation of the reference axes and measured changes in orientation between the principal axis of the first axle member and the first member, responsive to movement of the apparatus through a predetermined distance.

22. The apparatus of claim 19 wherein said connecting means includes steering members connecting said first, second and third axle members.

23. The apparatus of claim 22 wherein said steering members are pivotably connected to portions of said first and second axle members equidistant from said first member and on opposite sides of said first member.

24. A method of measuring data from which locational coordinates of points along a survey path on a surface may be calculated, employing a survey vehicle apparatus having a first member and a second member, said members being supported on the surface, being coupled to each other and being movable with respect to each other, said method comprising the steps of:
measuring locational parameters of the vehicle apparatus in an initial position sufficient to determine the orientation and location coordinates of the first member with respect to a reference coordinate system;
measuring the initial orientation of the first and second members with respect to one another;
moving the vehicle a predetermined distance so that the second member is located in approximately the initial position of the first member; and
measuring changes in the orientation of the first and second members with respect to one another.

* * * * *